Patented June 18, 1929.

1,717,453

UNITED STATES PATENT OFFICE.

FERDINAND KELLER AND KARL SCHNITZSPAHN, OF OFFENBACH-ON-THE-MAIN, GERMANY, ASSIGNORS TO GRASSELLI DYESTUFF CORPORATION, OF NEW YORK, N. Y., A CORPORATION OF DELAWARE.

DIAZOSALT PREPARATION FOR DYEING AND PRINTING.

No Drawing. Original application filed December 24, 1925, Serial No. 77,576, and in Germany January 19, 1925. Divided and this application filed March 24, 1927. Serial No. 178,132.

This invention relates to the use for dyeing and printing of diazosalt preparations comprising neutral 1.5-naphthalenedisulfonic acid diazonium salts of unsulfonated substituted aromatic amines, to which under certain conditions further substances which are useful in dyeing may be added.

The neutral 1.5-naphthalenedisulfonic acid diazonium salts are mentioned in U. S. Patent 1,200,726, granted to Hankel, October 10, 1916, as starting materials for the preparation of nitrosamine salts, but their use as diazo dye salts has not heretofore been known or described. They possess a fastness and stability which for diazosalts is very good. The dyes produced from them, especially those of 2.3-hydroxynaphthoic-acid arylids correspond in color and clearness with the dyes obtainable from freshly prepared mineral acid diazosalt solutions. The solubility of the 1.5-naphthalenedisulfonates varies according to the character of the diazonium bases from which they are made, but is sufficiently good even in the case of those which are more difficultly soluble so that deep and very useful dyeings are obtained, notably upon materials which have been block printed with 2.3-hydroxynaphthoic-acid arylids and especially if the solubility is improved by the admixture of metal salts of arylsulfonic acids as described in our copending application Ser. No. 74,161, filed Dec. 8, 1925.

The 1.5-naphthalenedisulfonates of diazonium bases have the advantage over the 2.7- and 2.6-disulfonates of the German Patent 94,280, granted July 26, 1894, to Fabriques de Produits Chimiques de Thann et de Mulhouse, that the 1.5-naphthalenedisulfonic acid metal salts which are necessary for their production—by mutual transposition from aqueous mineral acid diazosalt solutions prepared in the customary manner—are easily separated uniformly and that the 1.5-naphthalenedisulfonic acid diazosalts resulting from the treatment of mineral acid diazosalt solutions with the metal salts of 1.5-naphthalenedisulfonic acids are capable of being easily separated in a crystallized or crystalline form from their aqueous solutions without any difficult operation of concentration by evaporation and are then easily dried.

The commercial advance represented by the new preparations is due to a number of excellent characteristics of the 1.5-naphthalenedisulfonic acid diazonium salts; such as, the capability of being readily separated in a uniform state and the ability of being easily dried, their property of being sufficiently soluble, the clearness of the shades they produce, and their high stability.

The following examples are given to illustrate the invention:

(1) A mixture of 46 parts of neutral 1.5-naphthalenedisulfonate of diazotized o-chloranilin of 28% chloranilinebase content having the formula

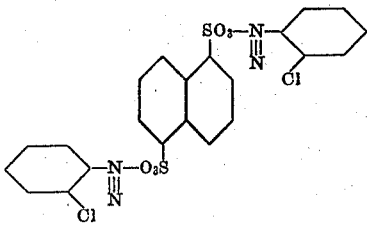

5 parts of aluminum sulfate and 49 parts of sodium salt of benzenesulfonic acid yields a product of very high stability, which is easily dissolved and which is adapted for dyeing directly cotton which has been impregnated with a coupling compound.

(2) The product obtained by mixing 59 parts of neutral 1.5-naphthalenedisulfonate of diazotized dianisidine of 34% dianisidine-base content having the formula

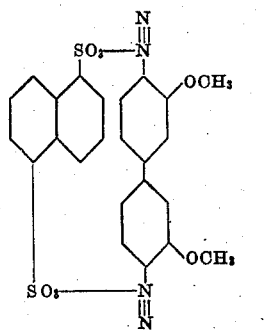

with 20 parts of partially dehydrated aluminium sulfate and 31 parts of sodium salt of 2.7-naphthalenedisulfonic acid is dissolved at 35–40° C. and yields an aqueous solution which is directly useful for dyeing. Copper salts or other salts may also be added to the product.

This application is a division of our application filed December 24, 1925, Serial No. 77,576.

We claim:

1. In a process of dyeing, the step which comprises treating a textile material, impregnated with a coupling compound, with a neutral 1.5-naphthalenedisulfonic acid diazonium salt of an unsulfonated substituted aromatic amine.

2. In a process of dyeing, the step which comprises treating a textile material, impregnated with a 2.3-hydroxynaphthoic acid arylid, with a neutral 1.5-naphthalenedisulfonic acid diazonium salt of an unsulfonated substituted aromatic amine.

3. In a process of dyeing, the step which comprises treating a textile material, impregnated with a coupling compound, with an aqueous solution comprising a neutral 1.5-naphthalenedisulfonic acid diazonium salt of an unsulfonated substituted aromatic amine, and a metal salt of an aryl sulfonic acid.

4. A textile material impregnated with a coupling compound treated with a neutral 1.5-naphthalenedisulfonic acid diazonium salt of an unsulfonated substituted aromatic amine.

5. A textile material impregnated with a 2.3-hydroxynaphthoic acid arylid, treated with a neutral 1.5-naphthalenedisulfonic acid diazonium salt of an unsulfonated substituted aromatic amine.

In testimony whereof, we affix our signatures.

FERDINAND KELLER.
KARL SCHNITZSPAHN.